(12) United States Patent
Kim et al.

(10) Patent No.: US 9,948,226 B2
(45) Date of Patent: Apr. 17, 2018

(54) APPARATUS FOR DRIVING VOICE COIL ACTUATOR OF CAMERA AND METHOD THEREOF

(71) Applicant: DONG WOON ANATECH CO., LTD., Seoul (KR)

(72) Inventors: Young Hoon Kim, Seoul (KR); Min Ho Yun, Seoul (KR); Jin Park, Seoul (KR); Ho Jun Lee, Seoul (KR)

(73) Assignee: DONG WOON ANATECH CO., LTD., Seoul (KR)

( * ) Notice: Subject to any disclaimer, the term of this patent is extended or adjusted under 35 U.S.C. 154(b) by 0 days.

(21) Appl. No.: 15/111,464

(22) PCT Filed: Apr. 21, 2016

(86) PCT No.: PCT/KR2016/004155
§ 371 (c)(1),
(2) Date: Jul. 13, 2016

(87) PCT Pub. No.: WO2016/175503
PCT Pub. Date: Nov. 3, 2016

(65) Prior Publication Data
US 2017/0163196 A1 Jun. 8, 2017

(30) Foreign Application Priority Data

Apr. 27, 2015 (KR) .................. 10-2015-0059074
Feb. 19, 2016 (KR) .................. 10-2016-0019799

(51) Int. Cl.
*H02K 41/00* (2006.01)
*H02P 25/034* (2016.01)
(Continued)

(52) U.S. Cl.
CPC .............. *H02P 25/034* (2016.02); *G02B 7/09* (2013.01); *H04M 1/0264* (2013.01); *G02B 7/102* (2013.01)

(58) Field of Classification Search
CPC ... G05B 2219/41025; G05B 2219/42077; H02P 25/034; G02B 7/09
See application file for complete search history.

(56) References Cited

U.S. PATENT DOCUMENTS 7,054,094 B2 * 5/2006 Zhang ................. G11B 5/59611
360/75
8,379,903 B2 2/2013 Ko et al.
(Continued)

FOREIGN PATENT DOCUMENTS

CN 104052374 A 9/2014
JP 2008-178206 A 7/2008
(Continued)

*Primary Examiner* — Karen Masih
(74) *Attorney, Agent, or Firm* — Knobbe Martens Olson & Bear LLP

(57) ABSTRACT

An apparatus for driving a voice coil actuator of a camera and a method thereof are provided. The driving apparatus performs input shaping based on a resonance frequency of a voice coil actuator and damping of vibration in the voice coil actuator to generate a control signal using a shaping signal as an initial input from an unshaped control signal, and thereby drives the voice coil actuator using the control signal subjected to input shaping. The shaping signal is provided to remove the resonance of the voice coil actuator, and may be a pure shaping signal, such as a multi-step shaping signal or a toggle shaping signal, or a convoluted shaping signal obtained by convoluting such pure shaping signals. The driving apparatus may significantly reduce residual vibration and may enhance an auto-focus function of the voice actuator using input shaping control based on damping.

6 Claims, 23 Drawing Sheets

(51) Int. Cl.
 *G02B 7/09* (2006.01)
 *H04M 1/02* (2006.01)
 *G02B 7/10* (2006.01)

(56) References Cited

U.S. PATENT DOCUMENTS

2011/0046795 A1 2/2011 Fujimoto et al.
2012/0076343 A1 3/2012 Arai
2013/0169857 A1 7/2013 Christo et al.

FOREIGN PATENT DOCUMENTS

KR 10-0968851 B1 7/2010
TW 2009-15019 A 4/2009

\* cited by examiner

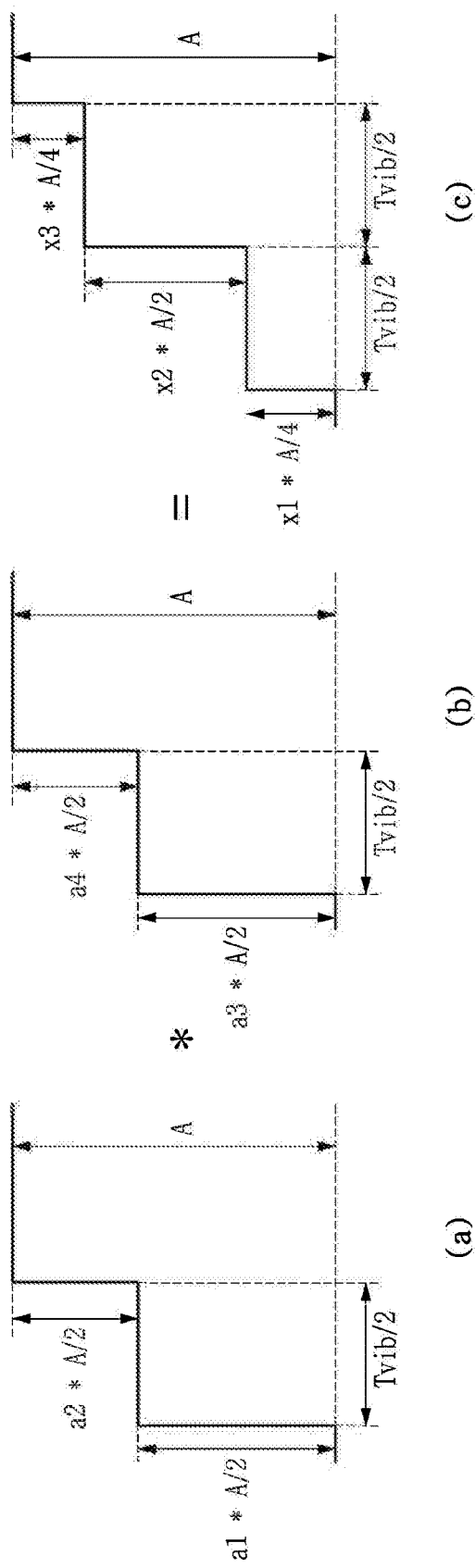

APPARATUS FOR DRIVING VOICE COIL ACTUATOR OF CAMERA AND METHOD THEREOF

TECHNICAL FIELD embodiments relate to a voice coil actuator (VCA), and more particularly, to an apparatus for driving a voice coil actuator of a camera and a method thereof.

BACKGROUND ART

A camera module commonly used in a mobile device, such as a cell phone, is provided with a voice coil actuator and moves a lens by driving the voice coil actuator to change its position, thereby performing auto-focusing on a particular object.

The voice coil actuator is a motor that is developed based on the fact that a vibration plate of a speaker moves back and forth when a force caused by the Fleming's left hand rule between a voice current flowing through a voice coil of the speaker and a magnetic force produced by a permanent magnet. As compared with a DC motor or a stepping motor which rotates, since the voice coil actuator reciprocates linearly over a short distance, it can be widely used for precise tracking or focusing.

The above-mentioned voice coil actuator includes a large coil (L; inductor) component. However, the inductor (L) component of the voice coil actuator exhibits high resonance response characteristics due to its own resonance frequency and causes residual vibration during operation, so that there are problems in that an auto-focus function of the camera may be affected or a malfunction is caused.

To address the aforesaid problems, KR 10-0968851 B1 provides an input shaping control technique capable of enhancing an auto-focus function of a camera by reducing undesired residual vibration.

However, the aforesaid input shaping control method does not consider damping, which may exist in any type in reality, the effect of reducing residual vibration is limited.

PRIOR ART DOCUMENT

Patent document: KR 10-0968851 B1 (Jul. 9, 2010)

DISCLOSURE OF INVENTION

Problem to be Solved by the Invention

The invention is conceived to satisfy the aforementioned needs, and embodiments of the invention provide a voice coil actuator of a camera that enhances an auto-focus function of the camera by effectively reducing residual vibration using input shaping control based on damping, and a method thereof.

However, the invention should not be construed as being limited to the embodiments set forth herein, and rather, these embodiments are provided so that this disclosure will fully convey the scope of the invention to those skilled in the art.

Means for Solving Problem

According to an embodiment of the invention, an apparatus for driving a voice coil actuator of a camera, the apparatus includes: an input shaping unit which performs input shaping based on a resonance frequency of a voice coil actuator and damping of vibration in the voice coil actuator to generate a control signal using a shaping signal as an initial input from an unshaped control signal; and a drive unit which drives the voice coil actuator using the control signal subjected to the input shaping performed by the input shaping unit.

The shaping signal may be a multi-step shaping signal or a toggle shaping signal and may have a signal fluctuation gradually decreasing based on the damping of vibration.

The input shaping unit may generate a sequence of impulses corresponding to the resonance frequency and the damping of vibration, and may convolute the generated sequence of impulses with a reference signal to generate the shaping signal.

The input shaping unit may generate a toggle shaping signal having a toggle period, may apply a damping value for each edge to each toggle edge of the toggle shaping signal according to the damping of vibration, and may gradually decrease a signal fluctuation of each toggle edge.

The input shaping unit may divide a target magnitude into a plurality of steps to generate a multi-step shaping signal of which a magnitude sequentially varies, may delay a phase of the multi-step shaping signal by "a total phase/N" for each of N number of steps to output the multi-step shaping signal, and may apply a damping value to each step of the multi-step shaping signal according to the damping of vibration to decrease a signal fluctuation of each step.

The total phase may be 360°.

The total phase may be defined by an integer multiple or decimal multiple of 360°.

When a resonance period of the voice coil actuator is $T_{vib}$, the target magnitude is A, and a coefficient for each step is $k_i$, the input shaping unit may apply each step during the period of $T_{vib}/N$ so as to increase or decrease the magnitude for each step by $k_i*(A/N)$ with respect to the multi-step shaping signal having N number of steps, and allow the magnitude of the multi-step shaping signal to reach A within the period of $T_{vib}$.

The input shaping unit may distribute the phase of each step so as to allow signals constituting the plurality of steps to have a resonance period in which waveforms of the signals are offset by one another.

The input shaping unit may convolute a first shaping signal and a second shaping signal to generate the shaping signal, each of the first and second shaping signals being a multi-step shaping signal or a toggle shaping signal and having a signal fluctuation gradually decreasing based on the damping of vibration.

According to an embodiment of the invention, a method of driving a voice coil actuator of a camera, the method includes: a first step of performing input shaping based on a resonance frequency of a voice coil actuator and damping of vibration in the voice coil actuator; a second step of driving the voice coil actuator using the control signal subjected to the input shaping performed by the input shaping unit.

The shaping signal may be a multi-step shaping signal or a toggle shaping signal and may have a signal fluctuation gradually decreasing based on the damping of vibration.

The first step may include generating a sequence of impulses corresponding to the resonance frequency and the damping of vibration; and convoluting the generated sequence of impulses with a reference signal to generate the control signal using the shaping signal as the initial input.

The first step may include generating a toggle shaping signal having a toggle period, applying a damping value for each edge to each toggle edge of the toggle shaping signal according to the damping of vibration, and gradually decreasing a signal fluctuation of each toggle edge.

The first step may include dividing a target magnitude into a plurality of steps to generate a multi-step shaping signal of which a magnitude sequentially varies, delaying a phase of the multi-step shaping signal by "a total phase/N" for each of N number of steps to output the multi-step shaping signal, and applying a damping value to each step of the multi-step shaping signal according to the damping of vibration to gradually decrease a signal fluctuation of each step.

The total phase may be 360°.

The total phase may be defined by an integer multiple or decimal multiple of 360°.

The first step may include, when a resonance period of the voice coil actuator is $T_{vib}$, the target magnitude is A, and a coefficient for each step is $k_i$, applying each step during the period of $T_{vib}/N$ so as to increase or decrease the magnitude for each step by $k_i*(A/N)$ with respect to the multi-step shaping signal having N number of steps, and allowing the magnitude of the multi-step shaping signal to reach A within the period of $T_{vib}$.

The first step may include distributing the phase of each step so as to allow signals constituting the plurality of steps to have a resonance period in which waveforms of the signals are offset by one another.

The first step may include convoluting a first shaping signal and a second shaping signal to generate the shaping signal, each of the first and second shaping signals being a multi-step shaping signal or a toggle shaping signal and having a signal fluctuation gradually decreasing based on the damping of vibration.

Effect of the Invention

According one or more embodiments of the invention, a voice coil actuator of a camera and a method thereof may enhance an auto-focus function of the camera by effectively reducing residual vibration using input shaping control based on damping.

BRIEF DESCRIPTION OF DRAWINGS

FIG. 5 is a waveform diagram illustrating a shaping signal generated according to still another embodiment;

EMBODIMENTS OF THE INVENTION

Figure 1:
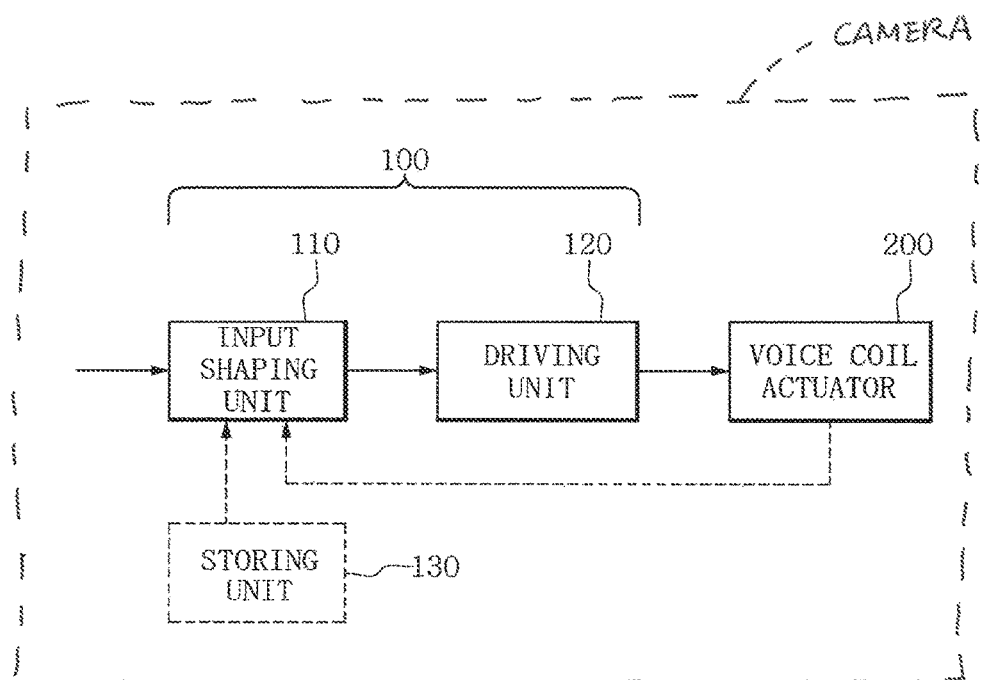
FIG. 1 is a schematic diagram illustrating an apparatus for driving a voice coil actuator of a camera according to an embodiment.

Advantages and features of the invention and methods for achieving them will be made clear from embodiments described below in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the embodiments in order to prevent the invention from being obscurely interpreted. Like reference numerals refer to like elements throughout the specification.

Hereinafter, an apparatus for driving a voice coil actuator of a camera and a method thereof will be described with reference to the accompanying drawings.

FIG. 1 is a diagram illustrating an apparatus for driving a voice coil actuator of a camera according to an embodiment.

An apparatus 100 for driving a voice coil actuator (hereinafter, also referred to as a "voice coil actuator driving apparatus 100") is based on an input shaping technique using a unique resonance frequency of a voice coil actuator 200 in order to reduce high resonance response characteristics of the voice coil actuator 200, and thus reduces residual vibration of the voice coil actuator 200 mounted in the camera so as to stably drive the voice coil actuator 200 without a malfunction. Accordingly, accurate auto-focusing may be achieved.

Referring to FIG. 1, the voice coil actuator driving apparatus 100 used for driving the voice coil actuator 200 may include an input shaping unit 110 and a driving unit 120. In addition, the voice coil actuator driving apparatus 100 may selectively include a storing unit 130.

The input shaping unit 110 performs input shaping that converts an initial input of a control signal in order to significantly reduce the resonance of the voice coil actuator 200, based on the resonance frequency of the voice coil actuator 200 and damping of vibration in the voice coil actuator 200 to generate a control signal using a shaping signal as an initial input from an unshaped control signal.

As used herein, the term "initial input" of a signal refers to a signal shape during the initial period of time from a start point in time to a predetermined point in time, for example, during the settling period of time.

The conversion of an "initial input" of a signal refers to an input shaping technique of converting a signal shape during the initial period of time through calculation, such as convolution, so as to reduce residual vibration at the time of inputting the corresponding signal.

As previously described, as the input shaping unit 110 performs input shaping based on the resonance frequency of the voice coil actuator 200 and the damping of vibration in the voice coil actuator 200 to convert the initial input of the unshaped control signal, a control signal using a shaping signal as an initial input may be generated.

The resonance frequency and the vibration damping of the voice coil actuator 200 for input shaping may be preset.

In an embodiment, information on a resonance frequency and vibration damping for each voice coil actuator model may be stored in the storing unit 130 in advance, and when a voice coil actuator 200 is operated, a corresponding one of the resonance frequencies and the vibration dampings (e.g., damping ratios) of the voice coil actuator 200 may be selected to perform input shaping based on the selected resonance frequency and the damping ratio.

In an alternative embodiment, during the operation of the voice coil actuator 200, a resonance frequency and a damping ratio of the voice coil actuator 200 may be detected and may be used by receiving a feedback thereof.

For example, a scheme of detecting a resonance frequency that is determined by inductance or measuring basic physical parameters (e.g., displacement, acceleration, and vibration) by a sensor (not illustrated) during the operation of the voice coil actuator 200 to thereby obtain information on vibration damping may through a predetermined algorithm may be employed.

The shaping signal may be a multi-step shaping signal having multiple steps or a toggle shaping signal having a toggle period. In particular, the shaping signal may have a signal fluctuation gradually decreasing due to damping of vibration.

In this case, the input shaping unit 110 considers the damped vibration of the voice coil actuator 200 to apply the unique resonance frequency and the vibration damping of the voice coil actuator 200 and thereby generates a shaping signal having a signal fluctuation gradually decreasing due to the damping of vibration.

Further, the shaping signal may be a convoluted shaping signal newly generated by convoluting two shaping signals. In this case, each of the convoluted shaping signals may be a multi-step shaping signal or a toggle shaping signal having a signal fluctuation gradually decreasing due to the damping.

Considering that the voice coil actuator 200 is a system that actually has damping, residual vibration may be significantly reduced in a case where input shaping is performed based on the unique resonance frequency and the damping of the voice coil actuator 200 by considering the damped vibration thereof, as compared to a case where such damping is not considered.

The driving unit 120 receives the control signal using the shaping signal as an initial input from the input shaping' unit 110, and drives the voice coil actuator 200 connected to a rear end of the driving unit 120 in response to the control signal subjected to input shaping.

In an embodiment, the input shaping unit 110 generates a sequence of impulses based on the resonance frequency and the damping of the voice coil actuator 200, and convolutes the sequence of impulses with a reference signal to generate a shaping signal. As used herein, the reference signal refers to an unshaped control signal.

The voice coil actuator 200 vertically moves a lens module of the camera.

In an embodiment, the voice coil actuator 200 may include a lower leaf spring, an upper leaf spring, a lower spring mold, and an upper spring mold for stopping and limiting the range of the vertical movement of the lens module, a yoke which forms a path of a magnetic field including an inductor (L), and a bobbin which creates a magnetic field by currents. The voice coil actuator 200 is driven by the driving unit 120 in which a bolted joint of a male screw thread for focusing of the lens module and a female screw thread for focusing of the lens module adjusts currents for driving the voice coil actuator 200, so as to vertically move along the path of the magnetic field created by a magnetic property generated by the bobbin, which is a magnetic property generator, and by the yoke.

In this manner, the voice coil actuator driving apparatus 100 performs input shaping on the unshaped control signal being applied, to thereby reduce the resonance of the voice coil actuator 200 during the auto-focusing operation of the voice coil actuator 200 and enhance residual vibration. In particular, the voice coil actuator 200 considers damped vibration to apply the damping in input shaping and thereby significantly reduces vibration.

Figure 2A:
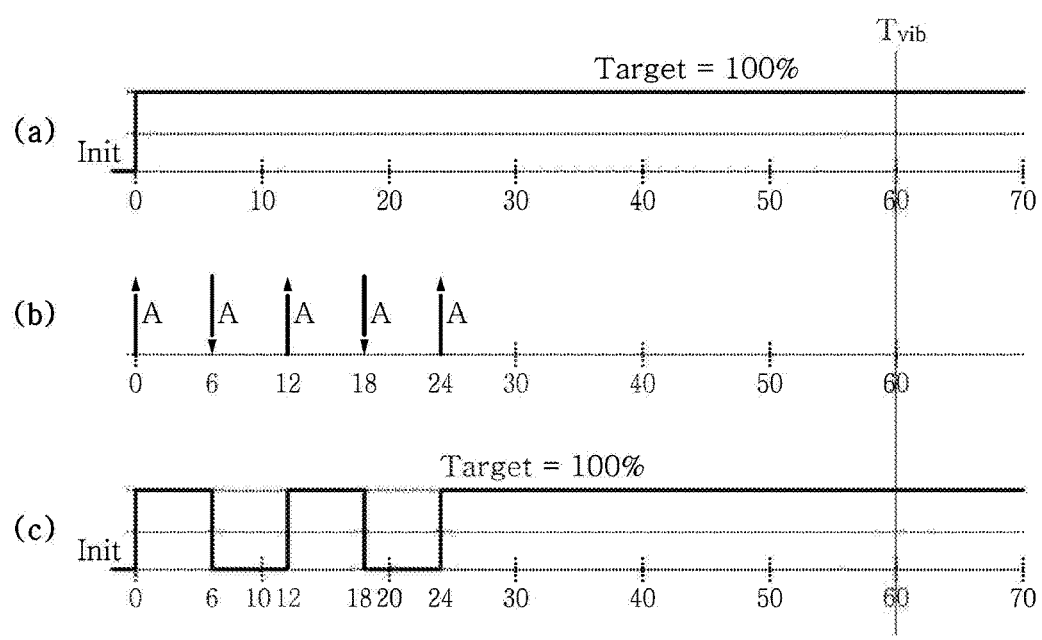
FIGS. 2A, 2B and 2C are waveform diagrams for explaining an operation of the input shaping applied to the embodiment in FIG. 1.
Figure 2B:
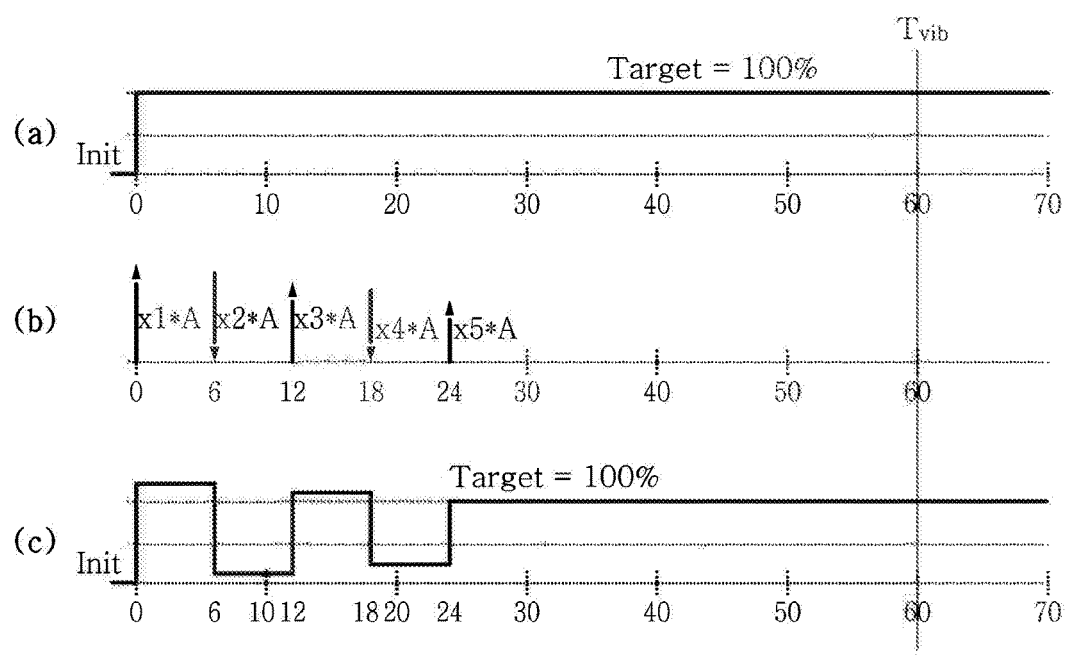
Figure 2C:
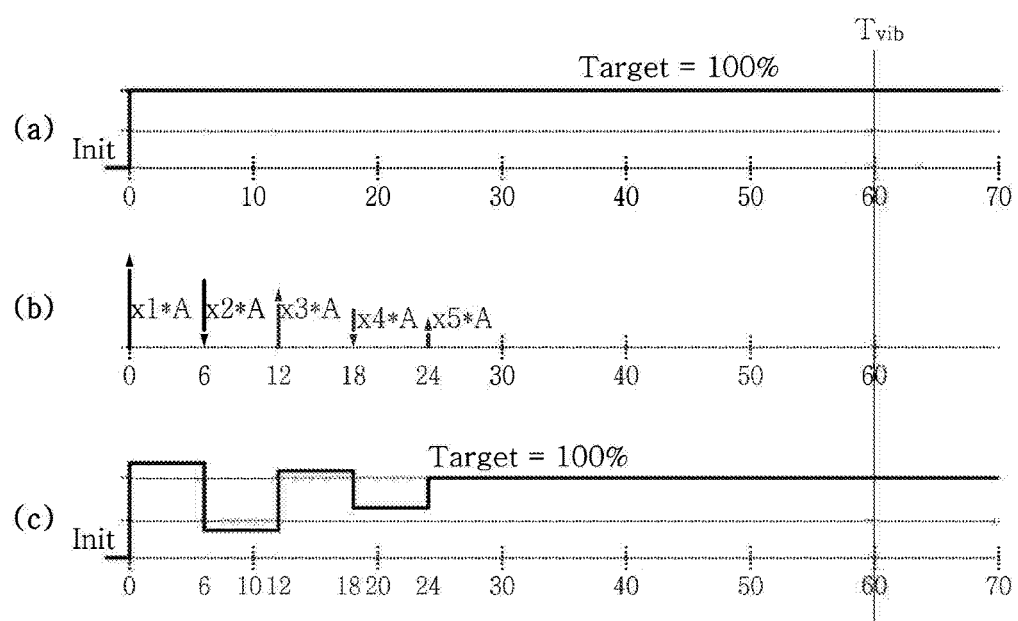

FIGS. 2A, 2B and 2C are waveform diagrams for explaining an operation of the input shaping applied to the embodiment in FIG.

FIG. 2A illustrates a method of performing input shaping using a sequence of impulses having the same amplitude without considering damping, and FIGS. 2B and 2C illustrate a method of adjusting the amplitude of a sequence of impulses based on the reduction of vibration due to damping.

When a single input, i.e., a reference signal as illustrated in (a) of FIG. 2A, is applied for a high-speed operation during the auto-focusing, residual vibration having a relatively high level occurs so as to increase a settling period of time.

In such an embodiment, when a sequence of impulses, as illustrated in (b) of FIG. 2A, convolutes with the reference signal as illustrated in (a) of FIG. 2A, an initial input of the reference signal varies as illustrated in (c) of FIG. 2A, and a vibration in the reference signal is offset by a vibration in the sequence of impulses such that residual vibration may be reduced and the settling period of time may be reduced.

In FIG. 2A, the sequence of impulses is obtained by assuming a case of undamped vibration where damping is not considered, i.e., a case where a damping ratio is zero.

Due to the undamped vibration, the impulses have the same amplitude, and the time location of the impulses is obtained based on a unique resonance frequency of a voice coil actuator 200 to be driven.

However, the voice coil actuator 200 of the camera is a system that actually has damping. Thus, in order to enhance the auto-focusing function by significantly reducing residual vibration a phenomenon in which vibration is reduced due to damping needs to be considered, and input shaping may be performed based on such damped vibration.

In a case where the impulses are set to have the same amplitude without considering damping as illustrated in FIG. 2A, the effect of reducing residual vibration may be limited, and in some case, residual vibration may not be offset as desired and may increase even more due to the shaped initial input.

According to the present embodiment, the voice coil actuator driving apparatus 100 considers damped vibration to adjust the sequence of impulses that performs input shaping based on damping, thereby enhancing the residual vibration reduction effect as compared to the case of undamped vibration.

FIGS. 2B and 2C illustrate an input shaping technique based on damping that is applicable to an embodiment.

FIG. 2B illustrates an example of a regularly damped vibration, i.e., when a damping ratio $\zeta$ is constant ($0<\zeta<1$). In the case of such regularly damped vibration (or when a damping ratio is constant in a predetermined period), the input shaping unit 110 of the voice coil actuator driving apparatus 100 may adjust a sequence of impulses that performs input shaping based on a sequentially damped value according to the damping ratio.

In FIG. 2B, input shaping is performed by convoluting a predetermined reference signal as illustrated in (a) of FIG. 2B with the sequence of impulses as illustrated in (b) of FIG. 2B.

The amplitude and the time location of the impulses in a sequence as illustrated in (b) of FIG. 2B are obtained based on a resonance frequency and a damping ratio of a voice coil actuator 200 to be driven.

In an embodiment, the damped vibration of the voice coil actuator 200 may have a constant damping ratio. In such an embodiment, the damping ratio may be applied to a corresponding period to generate a sequence of impulses, and convolutes the sequence of impulses with a predetermined reference signal to perform input shaping.

FIG. 2C illustrates an irregularly damped vibration.

In FIG. 2C, input shaping is performed by convoluting a predetermined reference signal as illustrated in (a) of FIG. 2C with a sequence of impulses as illustrated in (b) of FIG. 2C that is adjusted in response to the irregular damping.

The amplitude and the time location of the impulses in a sequence as illustrated in (b) of FIG. 2C are obtained based on a resonance frequency and a damping ratio of a voice coil actuator 200 to be driven.

As illustrated in FIGS. 2B and 2C, when the sequence of impulses applied with the damping of the voice coil actuator 200 is generated, and the generated sequence of impulses is convoluted with an unshaped control signal to perform input shaping thereon, residual vibration may be effectively reduced and the auto-focusing function may be enhanced as compared to the input shaping in which damping is not considered (see FIG. 2A).

FIGS. 3A to 3H are waveform diagrams illustrating a shaping signal generated according to an embodiment, e.g., a multi-step shaping signal.

In an embodiment, the multi-step shaping signal is obtained by applying damping to a multi-step signal having multiple steps that gradually change up to the point, of target level. The multi-step shaping signal has a multi-step signal shape having a gradually decreasing a signal fluctuation for each step.

As previously descried, the input shaping unit 110 of the voice coil actuator driving apparatus 100 performs input shaping based on a unique resonance frequency and damping of the voice coil actuator 200 to thereby significantly reduce residual vibration of the voice coil actuator 200.

For example, when a vibration in the voice coil actuator 200 occurring due to an initial input is applied with a vibration having a phase reverse to a phase of the initial vibration subsequent to a predetermined time period, and the initial vibration is subject to damping, the residual vibration in the voice coil actuator 200 may be significantly reduced during the movement or suspension of the voice coil actuator 200.

In an embodiment, the input shaping unit 110 of the voice coil actuator driving apparatus 100 sets the amplitude of a control signal that is a reference signal as a target level, and divides the target level into a plurality of steps to thereby generate a multi-step shaping signal having a step form and a sequentially varies amplitude.

In such a shaping signal, a phase of the multi-step shaping signal is delayed by a total phase (i.e., 360°)/N for each of N number of steps to be output, and a signal fluctuation for each step of the multi-step shaping signal gradually decreases by the application of a damping value to each step based on damping.

As used herein, the total phase refers to a range of a minimum phase to a maximum phase during a single period.

For example, when a single period is in a range of 0° to 360°, a phase is delayed by 360°/N for each step.

According to embodiments, the total phase may be defined as a multiple of 360° (an integer multiple or a decimal multiple, e.g., multiple of 360°×1.2, multiple of 360°×1.5, multiple of 360°×2, and so on).

Figure 3A:
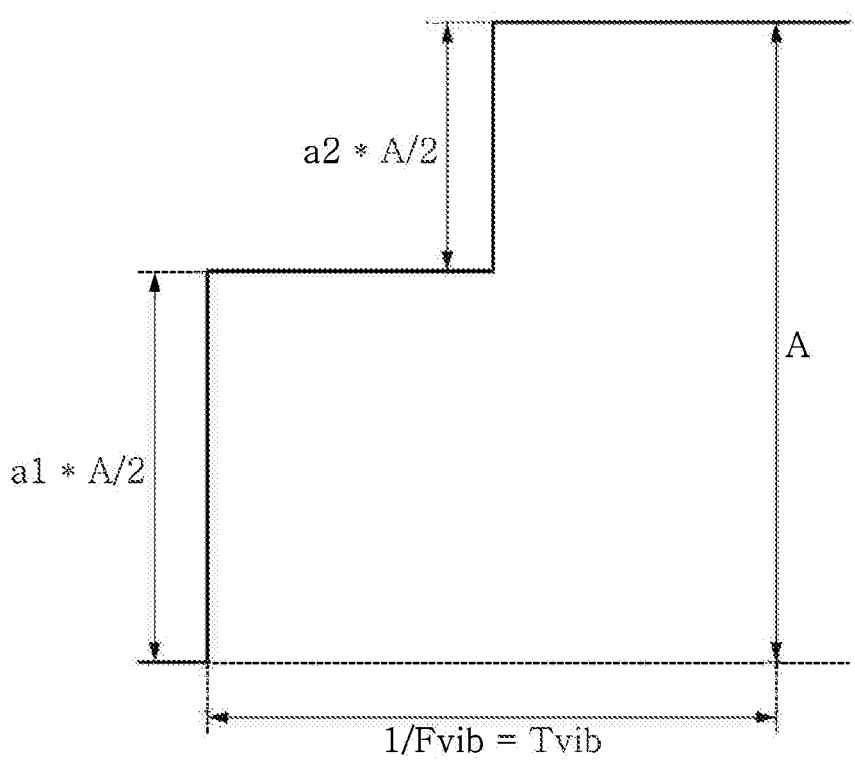
FIGS. 3A to 3H are waveform diagrams illustrating a shaping signal generated according to an embodiment.
Figure 3B:
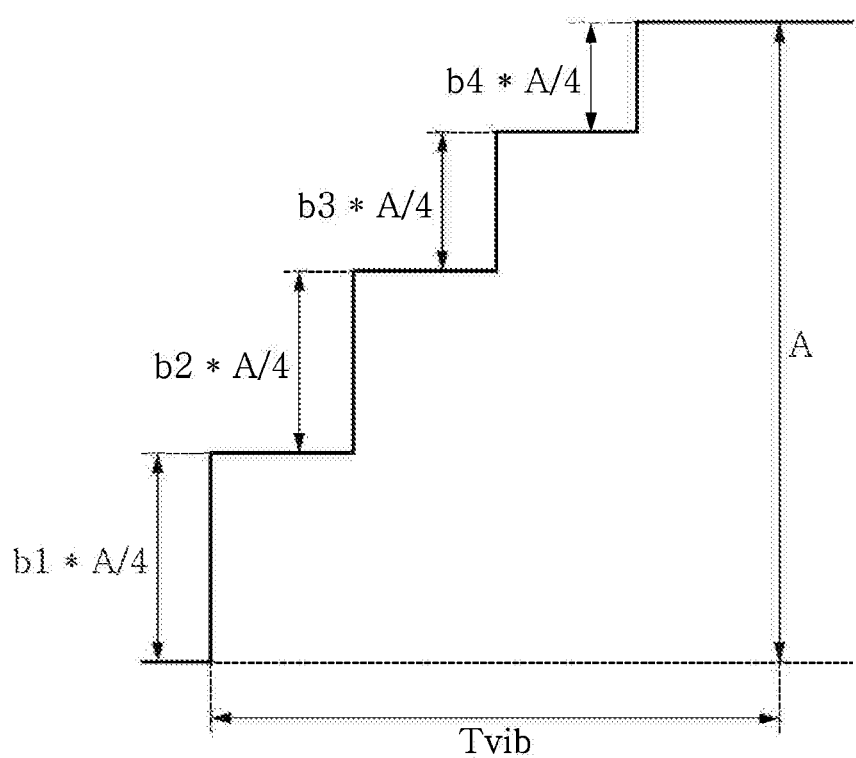
Figure 3C:
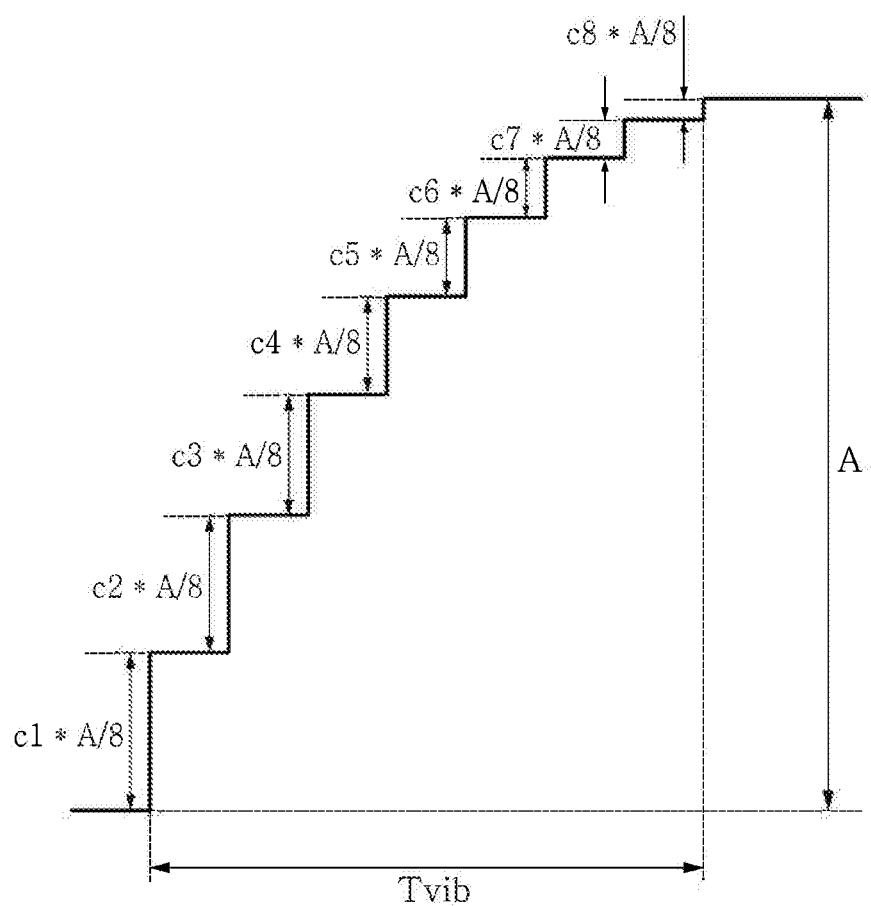
Figure 3D:
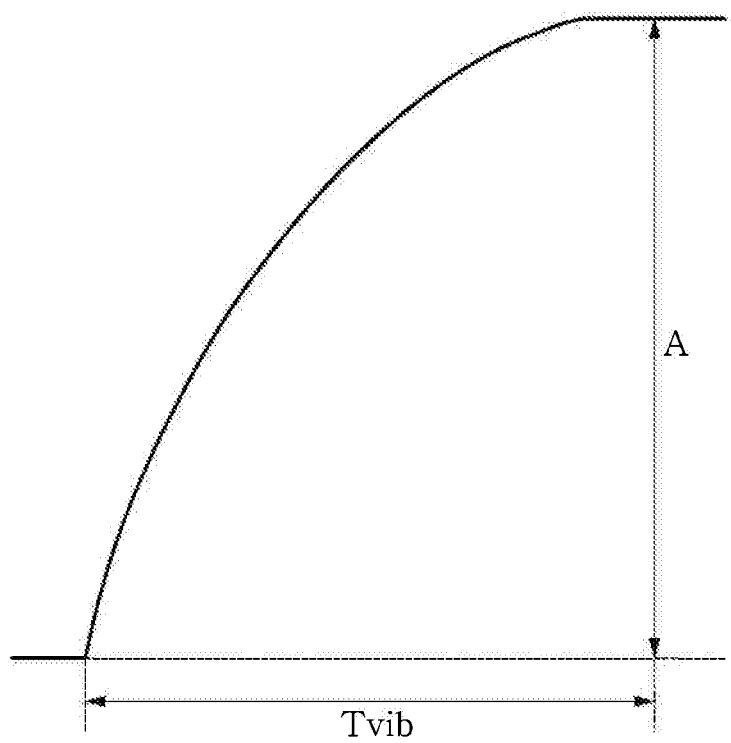

FIGS. 3A to 3D illustrate an example in which a target level is higher than a signal level at a starting point and the signal level gradually increases for each step up to the point of the target level. In detail, FIG. 3A illustrates a 2-step shaping signal, FIGS. 3B and 3C illustrate an N-step shaping signal having N number of steps (N being a natural number in a rage of 4 to 16), and FIG. 3D illustrates a curved shaping signal in which N is divided by 16 or more and the number of steps is extended).

As illustrated in FIG. 3A, when the 2-step shaping signal is applied to the voice coil actuator 200 based on an input shaping technique, vibration may be reduced to some extent, and this may be applied to the extended examples in FIGS. 32 and 3C.

When a resonance period of the voice coil actuator 200 is $T_{vib}$, a target level is A, and a coefficient for each step is $k_i$, the input shaping unit 110 performs input shaping to enables the level of the multi-step shaping signal to reach the target level A within $T_{vib}$ by sequentially applying each step of the multi-step shaping signal so as to increase the level of each step by $k_i*(A/N)$ with respect to N number of steps.

In addition, a phase of each step is divided so as to have a resonance period in which waveforms of signals having multiple steps are offset by one another.

When N number of steps in each of FIGS. 3A, 3B, and 3C is 2, 4, and 8, respectively, and a target level is A, a signal fluctuation for each step is $a_i*(A/2)(i=1, 2)$, $b_i*(A/4)$ (1=1, 2, 3, 4), $c_i*(A/8)(i=1, 2, 3, 4, 6, 8)$.

In FIG. 3A, the input shaping unit 110 divides the target level into two steps to generate 2-step shaping signal having a varying (e.g., increasing) level, and delays a phase for each step by "a total phase/2" 360°/2=180°) to output the signal. In other words, the input shaping unit 110 applies a second step signal having a phase delayed "a total phase/2" after applying a first step signal.

The input shaping unit 110 applies a damping value for each step to each step of the 2-step shaping signal based on damping to thereby gradually decreasing the signal fluctuation of each step by $a_1$ and $a_2$.

According to the s-step shaping signal in FIG. 3A, the input shaping unit 110 generates a vibration of a first step signal initially applied using a second step signal and a vibration having a phase reverse thereto, and thereby reduce the residual vibration of the voice coil actuator 200 that may occur while reaching the target level.

Further, the input shaping unit 110 adjusts the signal fluctuation in a step unit by $a_1$ and $a_2$ according to damping based on damped vibration, thereby enhancing the residual vibration reduction effect.

FIGS. 3B to 3D illustrate an N-step shaping signal having 4 to 16 steps and a curved shaping signal having 16 steps or more, which are extended from the example in FIG. 3A.

In FIGS. 3B and 3C, the input shaping unit 110 divides a target level into N number of steps (N being a natural number in a range of 4 to 16), generates an N-step shaping signal having a gradually varying (e.g., increasing) level, and delays a phase for each step by "a total phase/N" (e.g., 360°/N) to output the signal. On the other hand, the input shaping unit 110 applies a damping value for each step to each step of the multi-step shaping signal based on damping to thereby gradually decrease the signal fluctuation of each step.

In a case of a 4-step shaping signal in FIG. 3B, the phase thereof is constantly delayed in first, second, third, and fourth step signals, such that phase changes of, for example, 0°, 90°, 180°, and 270°, occur, and the 4-step shaping signal has a gradually decreasing a fluctuation based on damping.

FIG. 3C illustrates an example of an 8-step shaping signal.

As illustrated in FIGS. 3B and 3C, the step in FIG. 3A may be further divided, and the shaping signal may be applied by using a damping value for each step based on damping.

Accordingly, based on such multi-step scheme, the vibration in the voice coil actuator 200 may be significantly reduced.

The further division of the step of the shaping signal may be extended to 16 or more and thereby extended to the curved shaping signal as illustrated in FIG. 3D.

The vibration degree increases in the sequence of 2-step shaping signal<4-step shaping signal<8-step shaping signal<curved shaping signal in FIGS. 3A, 3B, 3C, and 3D, respectively.

In the case of performing the curved input shaping in FIG. 3D, the input shaping unit 110 minutely divides the step of the shaping signal into 16 or more, and performs shaping to obtain a control signal having a curved initial input as illustrated in FIG. 3D.

In this instance, the input shaping unit 110 divides a target level into 16 or more steps, applies a damping value for each step based on damping to gradually decrease the signal fluctuation of each step, and generates a curved shaping signal having a gradually varying level.

Figure 3E:
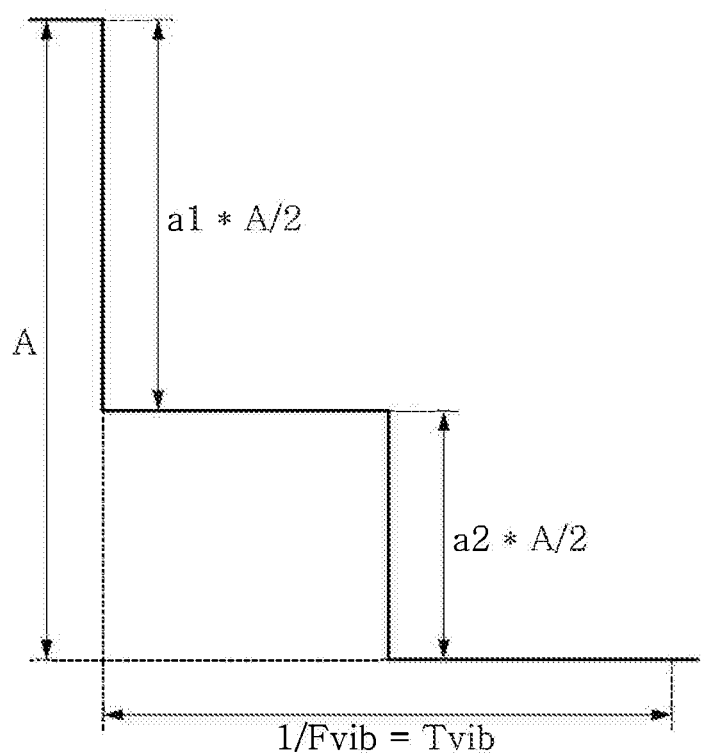
Figure 3F:
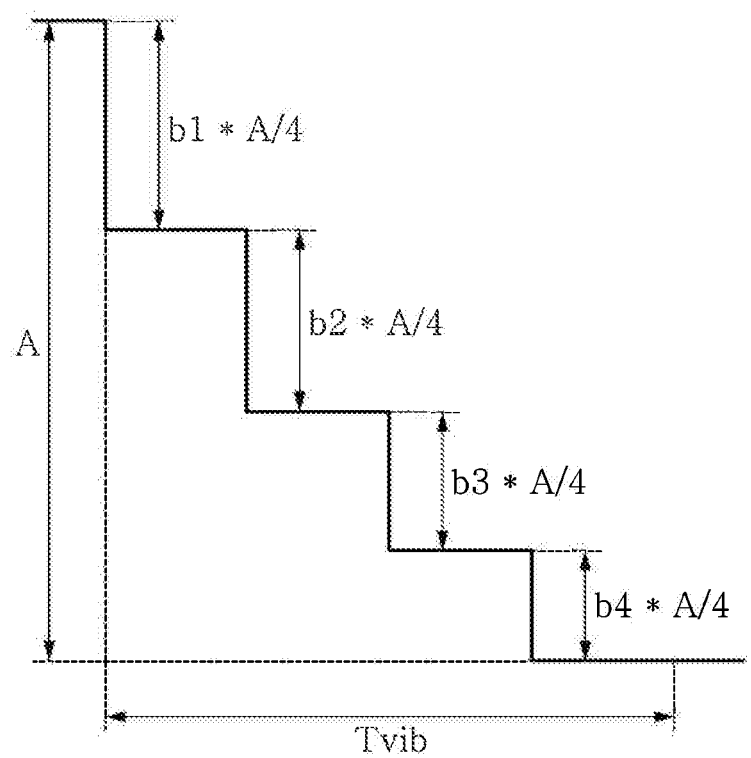
Figure 3G:
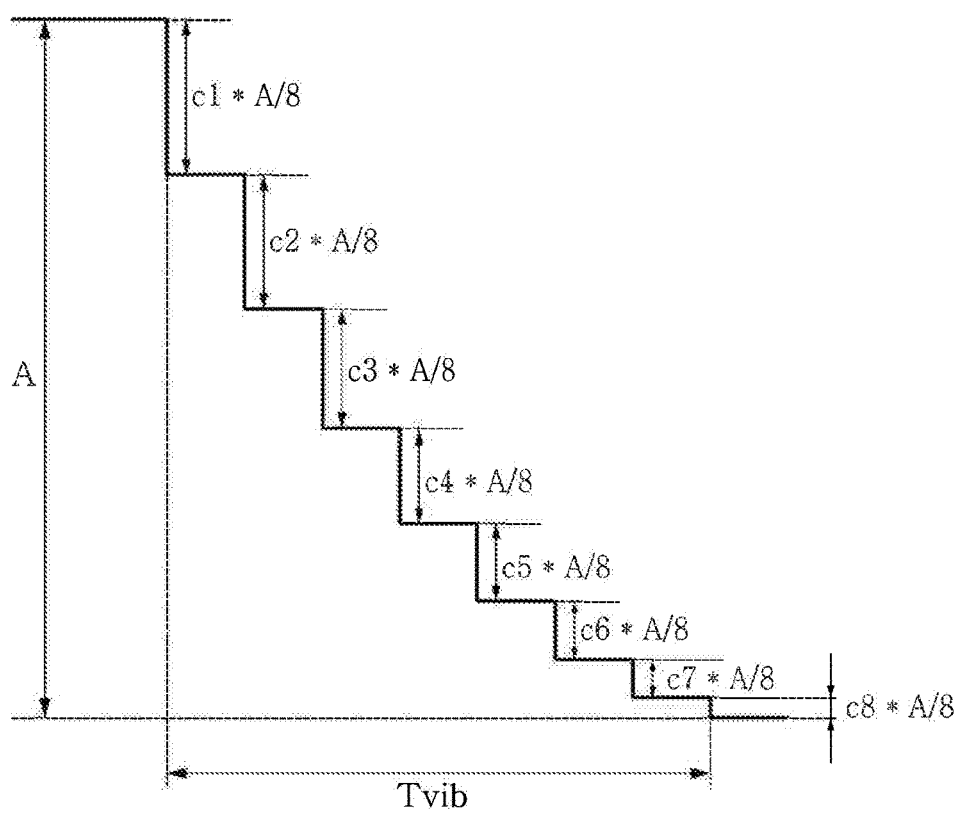
Figure 3H:
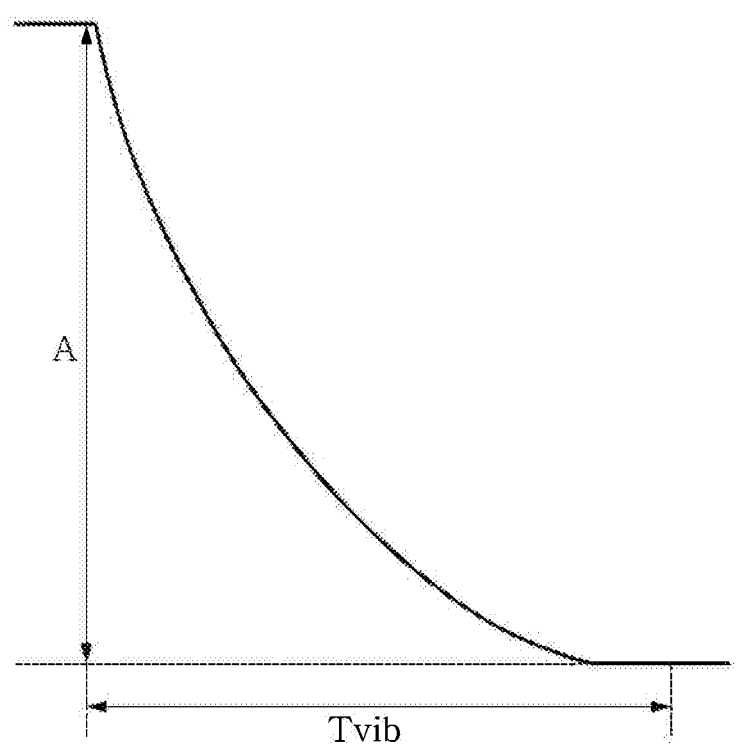

FIGS. 3E to 3H illustrate an example in which a target level is lower than a signal level at a starting point. FIGS. 3E and 3G illustrate an N-step shaping signal having N number of steps (N being a natural number in a range of 4 to 16), and FIG. 3H illustrates a curved shaping signal in which N is divided by 16 or more and the number of steps is extended).

When a resonance period of the voice coil actuator 200 is $T_{vib}$, a target level is A, and a coefficient for each step is $k_i$, the input shaping unit 110 performs input shaping to enables the level of the multi-step shaping signal to reach the target level A within $T_{vib}$ by sequentially applying each step of the multi-step shaping signal so as to decrease the level of each step by $k_i*(A/N)$ with respect to N number of steps.

In addition, a phase of each step is divided so as to have a resonance period in which waveforms of signals having multiple steps are offset by one another.

In FIG. 3E, the input shaping unit 110 divides the target level into two steps to generate a 2-step shaping signal having a varying (e.g., increasing) level, and delays a phase for each step by "a total phase/2" (e.g., 360°/2=180°) to output the signal. The input shaping unit 110 applies a second step signal having a phase delayed by "a total phase/2" after applying a first step signal.

The input shaping unit 110 applies a damping value for each step to each step of the 2-step shaping signal based on damping to thereby gradually decreasing the signal fluctuation of each step by $a_1$ and $a_2$.

In FIGS. 3F and 3G, the input shaping unit 110 divides a target level into N number of steps (N being a natural number in a range of 4 to 16), generates an N-step shaping signal having a gradually varying (e.g., increasing) level, and delays a phase for each step by "a total phase/N" (e.g., 360°/N) to output the signal. On the other hand, the input shaping unit 110 applies a damping value for each step to each step of the multi-step shaping signal based on damping to thereby gradually decrease the signal fluctuation of each step.

In a case of a 4-step shaping signal in FIG. 3F, the phase thereof is constantly delayed in first, second, third, and fourth step signals, such that phase changes of, for example, 0°, 90°, 180°, and 270°, occur, and the 4-step shaping signal has a gradually decreasing fluctuation based on damping.

FIG. 3G illustrates an example of an 8-step shaping signal, which has a gradually decreasing fluctuation in a step unit based on damping.

FIG. 3H illustrates an example of extending the number of steps of the multi-step shaping signal into 16 or more, applying a damping value for each step corresponding to damping, gradually decreasing the signal fluctuation of each step, and obtaining a curved shaping signal having a gradually varying level.

Figure 4A:
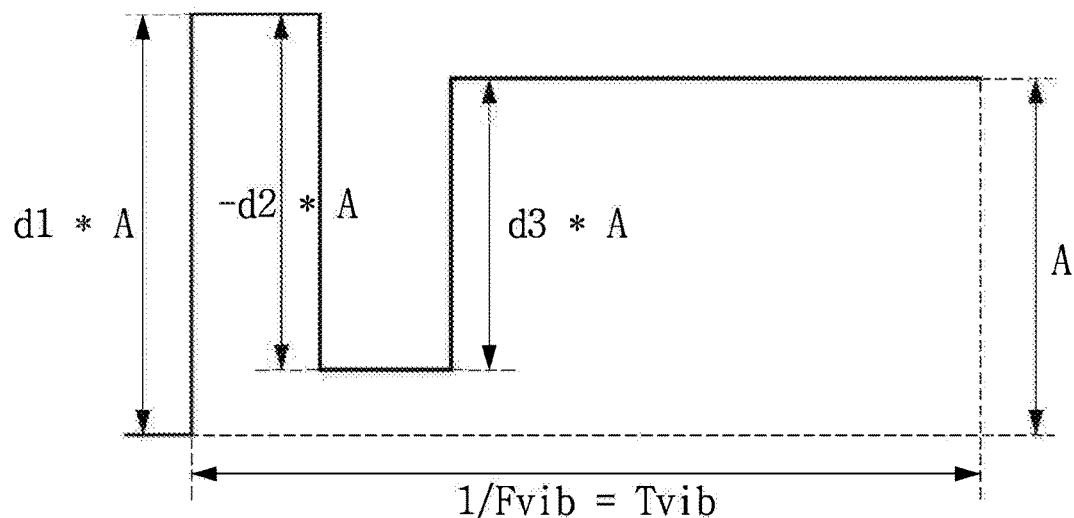
FIGS. 4A and 4B are waveform diagrams illustrating a shaping signal generated according to another embodiment.
Figure 4B:
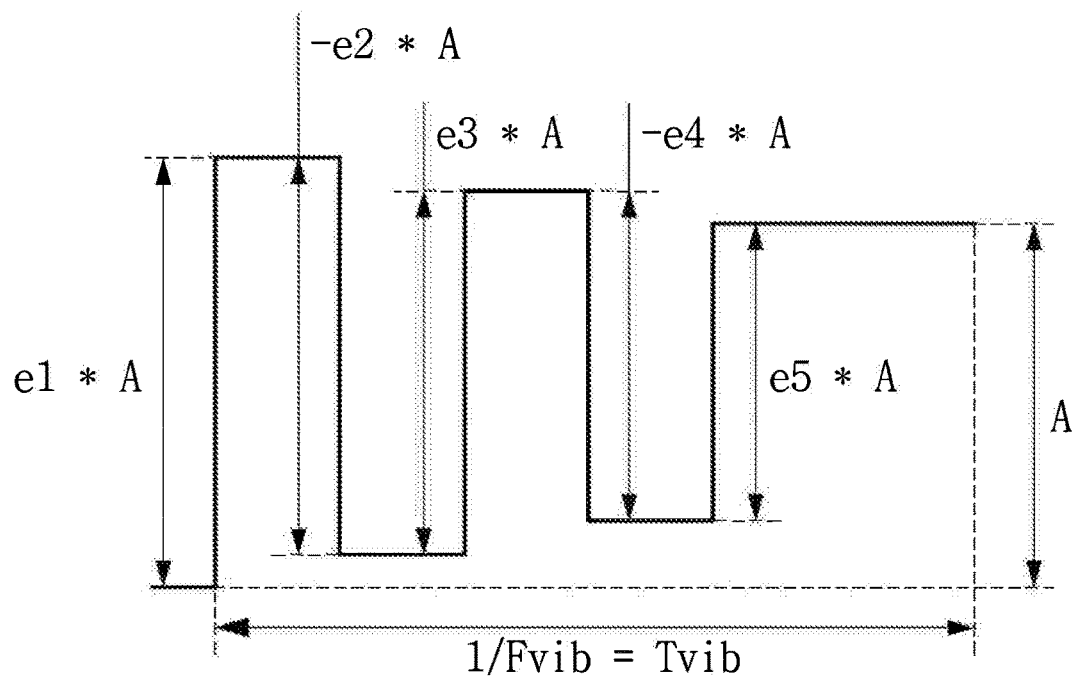

FIGS. 4A and 4B are waveform diagrams illustrating a shaping signal generated according to another embodiment.

In another embodiment, a toggle shaping signal is obtained by applying damping to a toggle signal in which a shift between a low level and a high level occurs more than once. The toggle shaping signal has a toggle signal shape in which the signal fluctuation of each edge gradually decreases due to damping.

An input shaping unit 110 generates a toggle shaping signal having a toggle period at the time of performing input shaping to output the signal. On the other hand, the input shaping unit 110 sequentially applies a damping value for each edge to each toggle edge to thereby gradually decrease the signal fluctuation of each toggle edge.

In the toggle period, the shaping signal moves from a high level to a low level at least once, and gradually decreases the signal fluctuation of each toggle edge (upward edge and downward edge) due to damping.

For example, FIG. 4A illustrates the signal fluctuation for each toggle edge as decreasing by $d_1$, $d_2$ and $d_3$, and FIG. 4B illustrates the signal fluctuation for each toggle edge as decreasing by $e_1$, $e_2$, $e_3$, $e_4$, and $e_5$.

Due to the application of such a toggle shaping signal, a settling period of time may be reduced as compared to a case where damping is not considered, such that the vibration of a voice coil actuator 200 may be offset for a shorter period of time to reach a target level for a shorter period of time as compared to the case where damping is not considered.

FIG. 5 is a waveform diagram illustrating a shaping signal generated according to still another embodiment.

An input shaping unit 110 may reduce a resonance of a voice coil actuator 200 by convoluting a first shaping signal with a second shaping signal to thereby generate a convoluted shaping signal for converting an initial input of a control signal.

FIG. 5 illustrates an example of convoluting a first shaping signal in (a) with a second shaping signal in (b) to thereby generate a convoluted shaping signal having a different shape.

When each step is applied during the period of $T_{vib}/2$ and the two 2-step shaping signals, i.e., (a) and (b), of which the level increases for each step by $a_i*(A/2)$ are convoluted, a convoluted shaping signal having a changing period for each step and a changing level for each step as illustrated in (c) may be obtained.

As such, the input shaping unit 110 may generate various input waveforms through convolution in order to reduce the vibration of the voice coil actuator 200 of a camera.

An input generated by convolution is obtained by convoluting the first shaping signal with the second shaping signal, and the input may have various forms based on a convolution scheme.

Each of the first and second shaping signal is a signal having a gradually decreasing fluctuation due to damping.

Examples of the first and second shaping signal may include the aforesaid 2-step shaping signal, a multi-step shaping signal having multiple steps in a range of 4 to 16, a curved shaping signal having 16 or more steps, and a toggle shaping signal.

FIGS. 6A to 8B are graphs illustrating simulation results of response times of shaping signals according to embodiments.

Figure 6A:
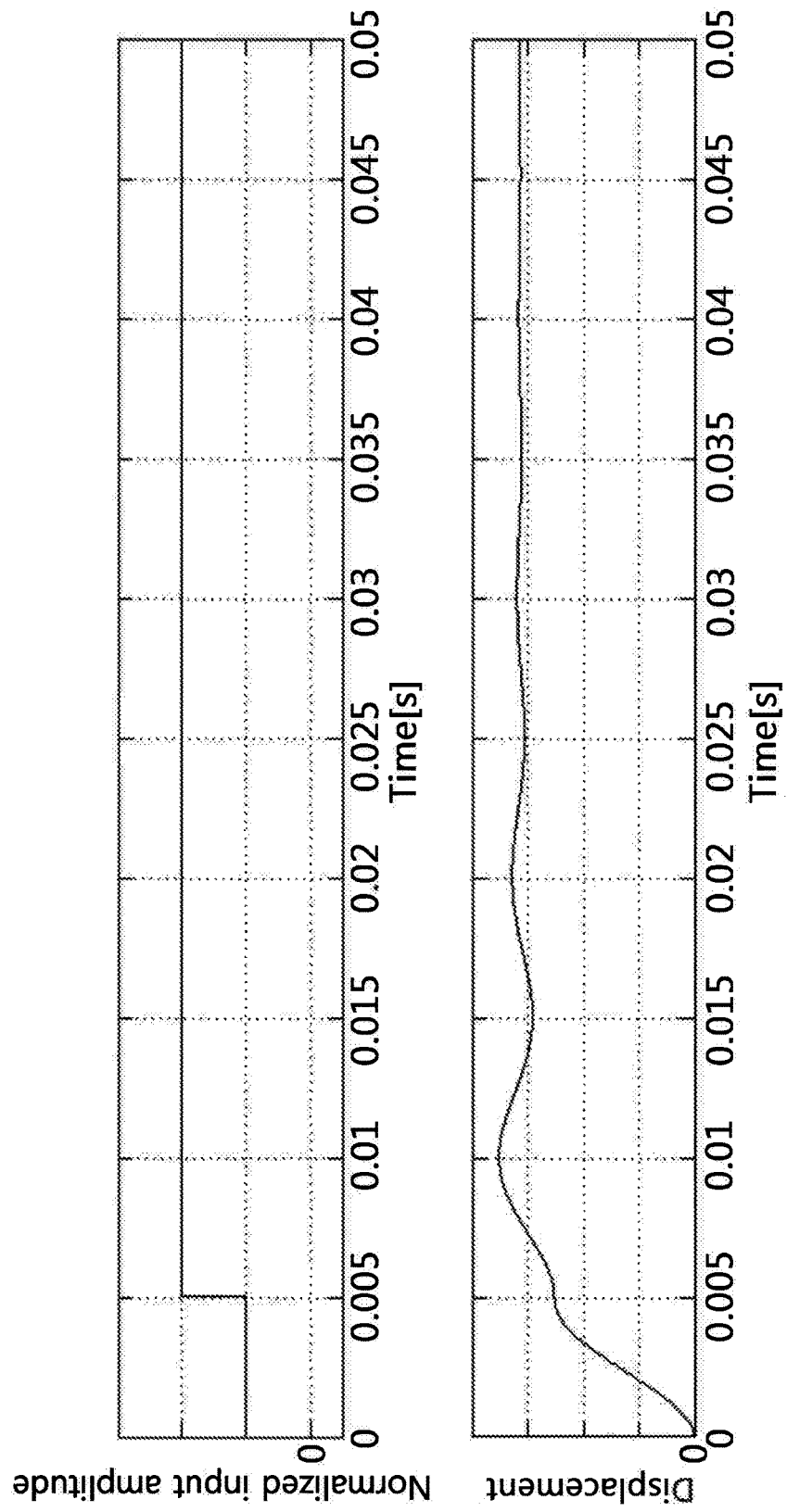
FIGS. 6A, 6B, 7A, 7B, 8A and 8B are graphs illustrating simulation results of response times of shaping signals according to embodiments.
Figure 6B:
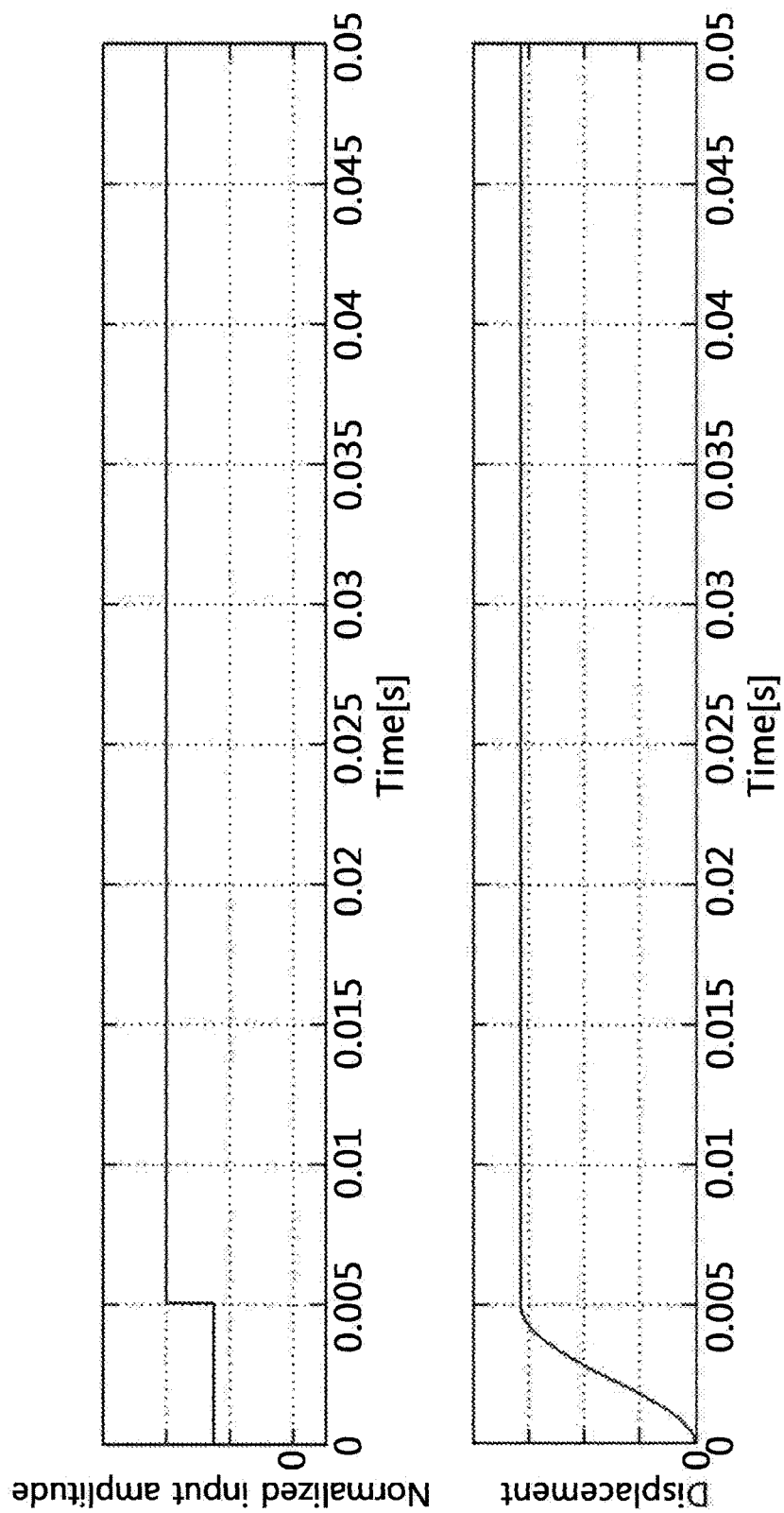

FIG. 6A illustrates a response time in a case where input shaping is performed using a multi-step shaping signal without considering damping, and FIG. 6B illustrates a response time in a case where input shaping is performed using a multi-step shaping signal based on damping.

Figure 7A:
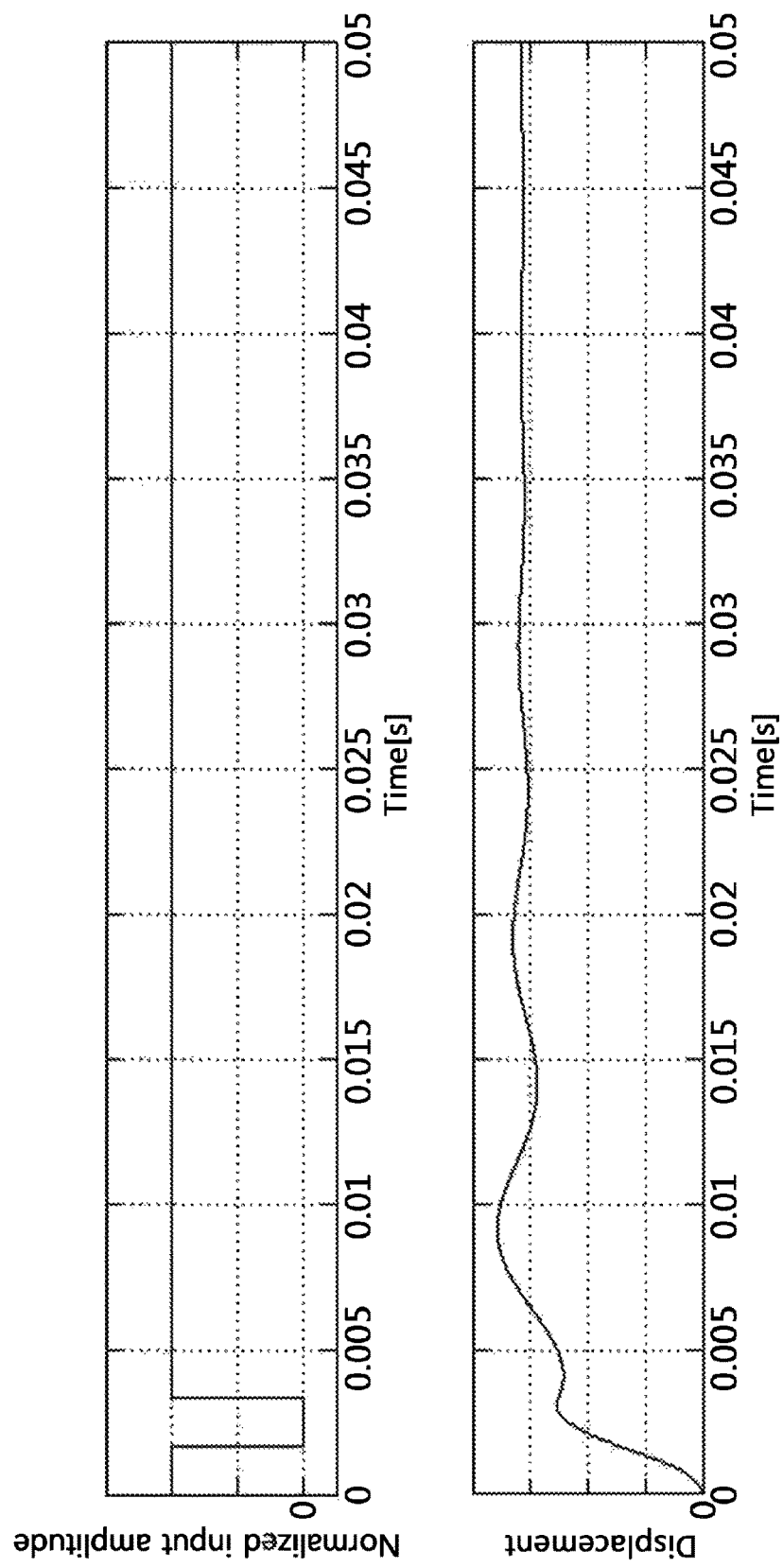
Figure 7B:
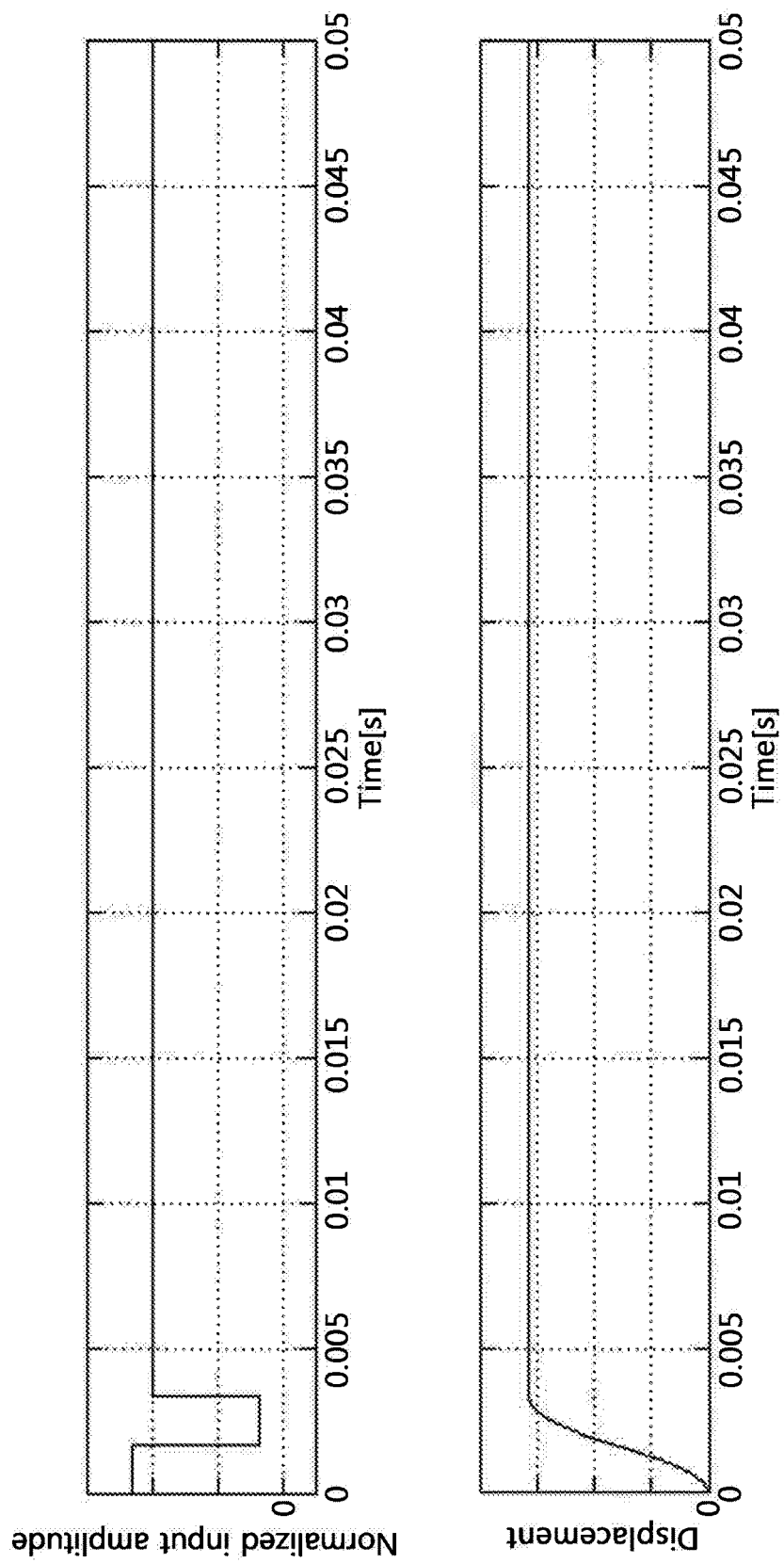

FIG. 7A illustrates a response time in a case where input shaping is performed using a toggle shaping signal without considering damping, and FIG. 7B illustrates a response time in a case where input shaping is performed using a toggle shaping signal based on damping.

Figure 8A:
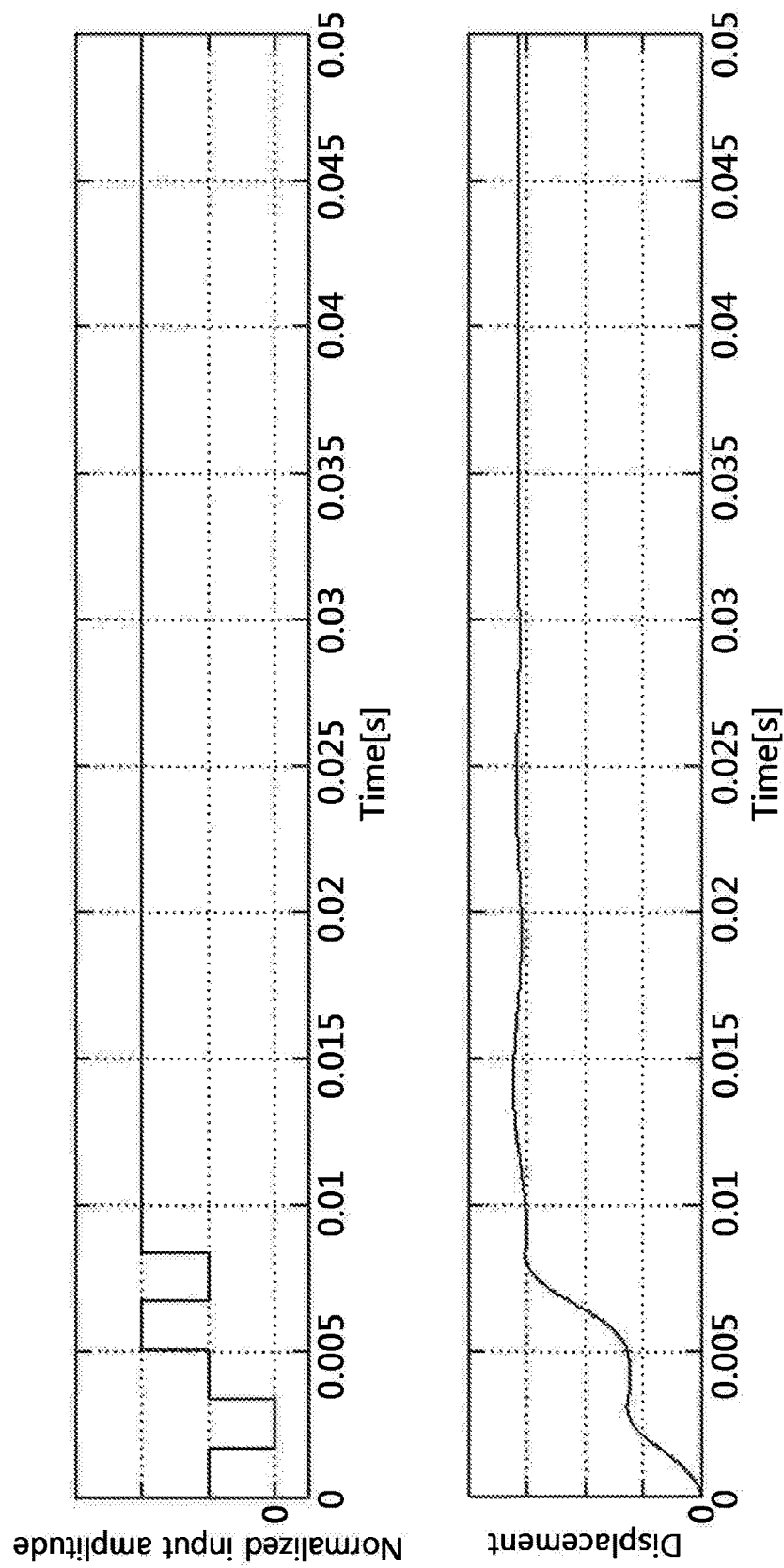
Figure 8B:
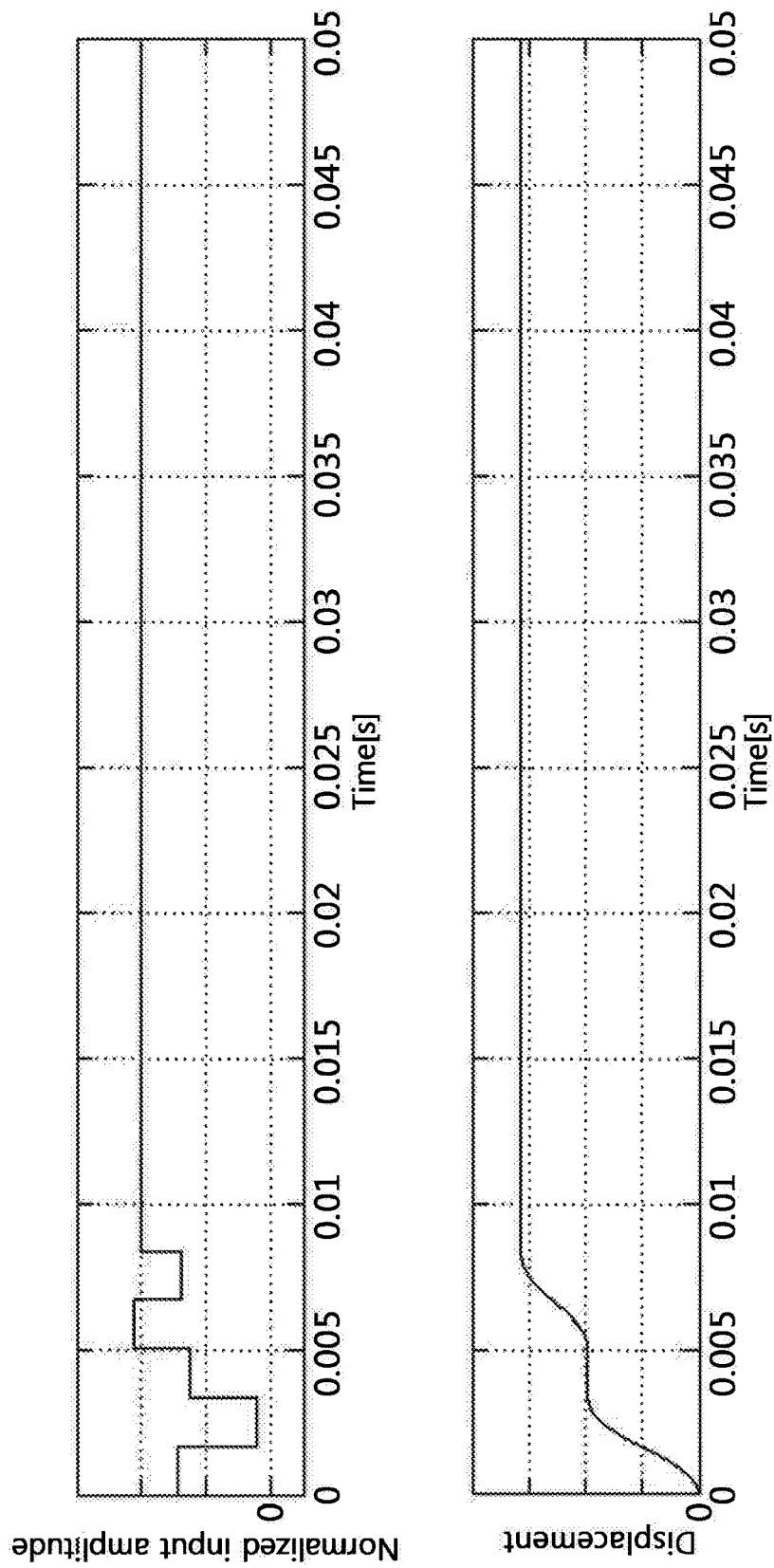

FIG. 8A illustrates a response time in a case where input shaping is performed using a convoluted shaping signal without considering damping, and FIG. 8B illustrates a response time in a case where input shaping is performed using a convoluted shaping signal based on damping.

Based on the simulation results above, the case where damped vibration is considered as illustrated in FIGS. 6B, 7B and 8B exhibits a shorter settling period of time and a higher vibration reduction effect than in the case where undamped vibration, is considered as illustrated in FIGS. 6A, 7A, and 8A.

Figure 9A:
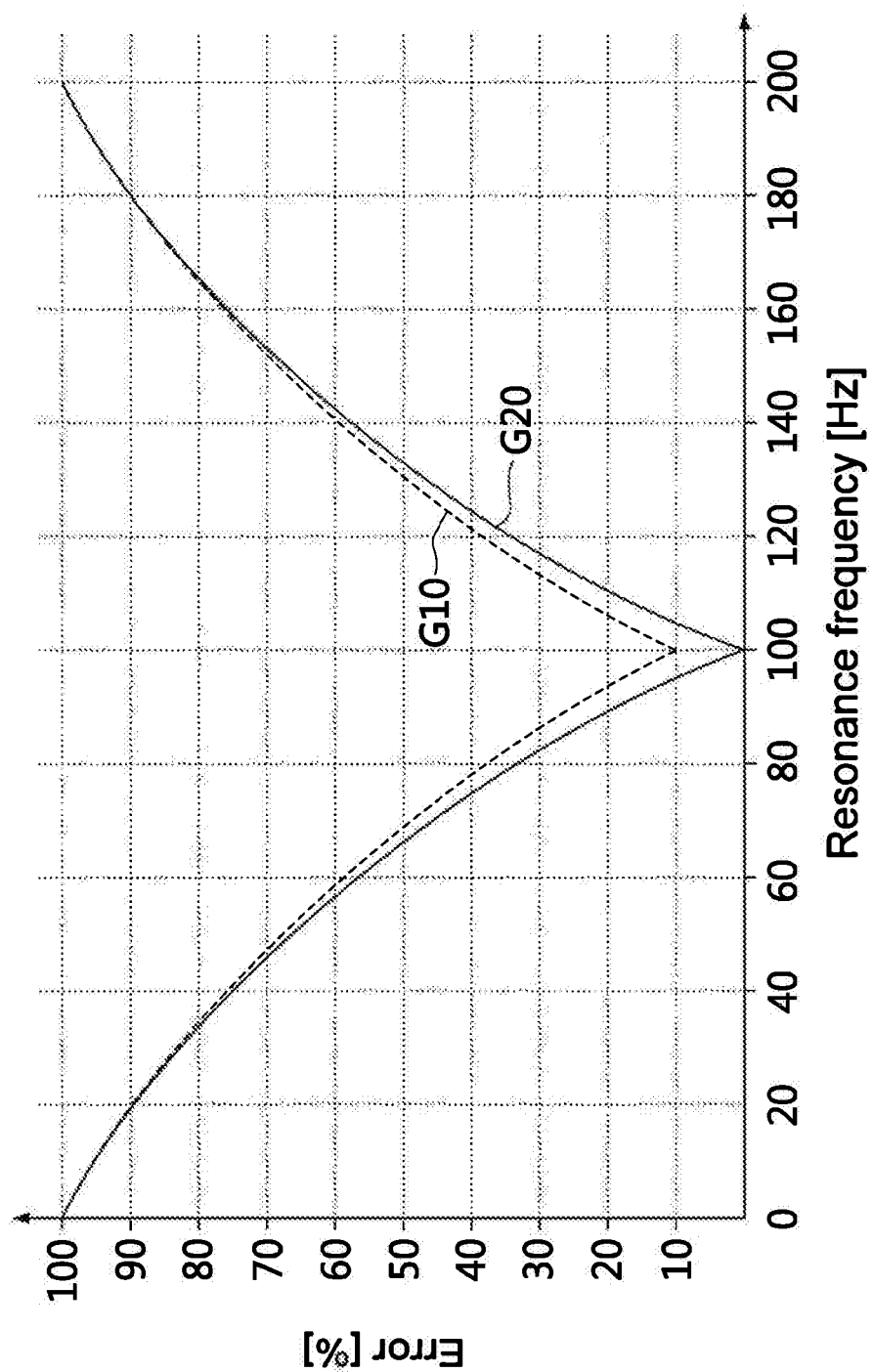
FIGS. 9A and 9B are graphs illustrating sensitivity to resonance frequency errors of shaping signals according to embodiments.
Figure 9B:
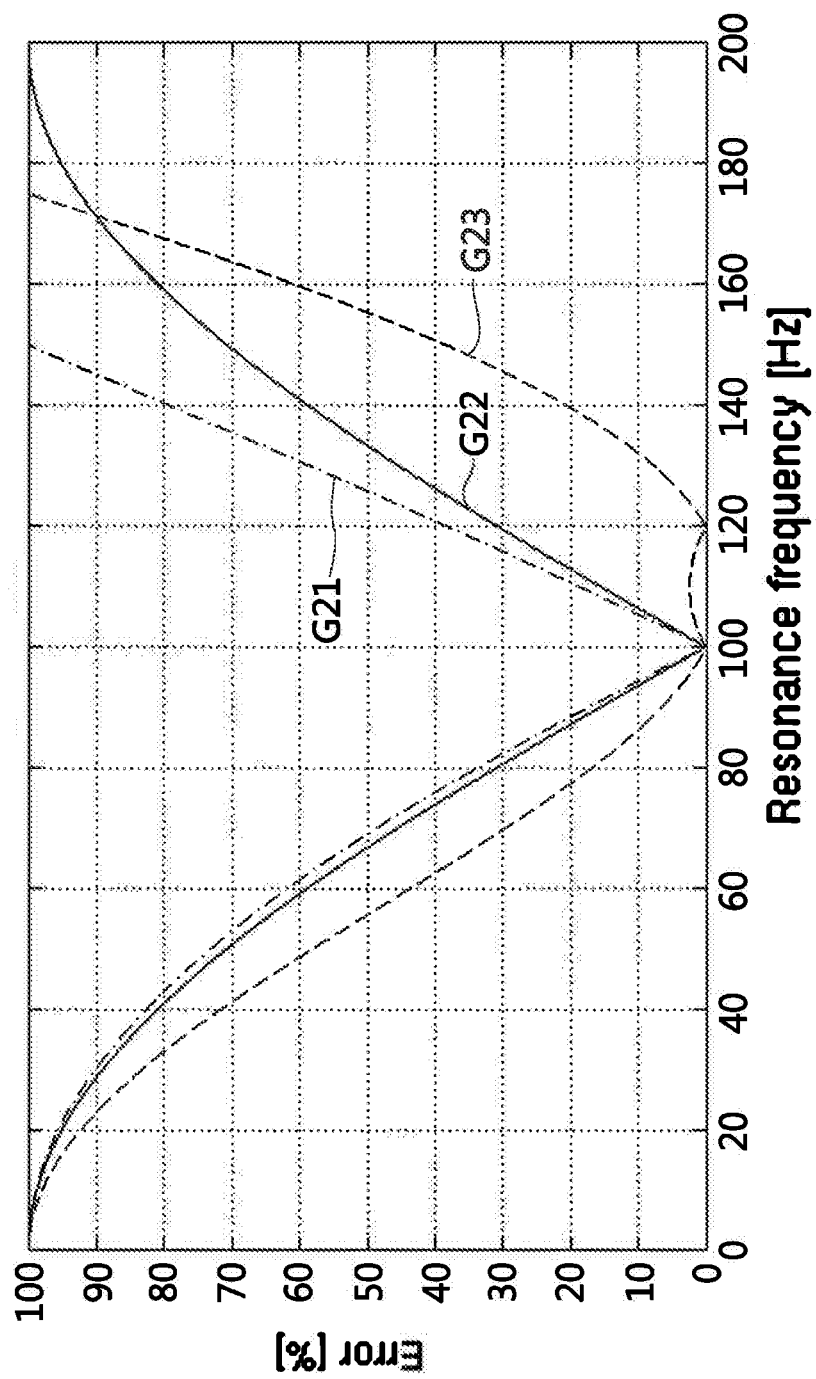

FIGS. 9A and 9B are graphs illustrating sensitivity to resonance frequency errors of shaping signals according to embodiments.

FIG. 9A illustrates a comparison between a graph (G10) where damping is not considered and a graph (G20) where damping is considered according to an embodiment.

Referring to the resonance frequency (F)-error rate relationship in FIG. 9A, the error rate graph (G20) based on damping is closer to zero than the error rate graph (G10) without considering damping. Accordingly, it may be appreciated from those graphs that an error rate in a case of adjusting a shaping signal based on shaping is lower than an error rate in a case where damping is not considered.

In other words, when a shaping signal is adjusted based on damping, an error rate may decrease even beyond a resonance period, and residual vibration may be reduced as compared to an undamped case.

FIG. 9B is a graph illustrating sensitivity depending on types of shaping signals, and illustrates sensitivity respective sensitivity levels of a toggle shaping signal (G21), a multi-step shaping signal (G22), and a convoluted shaping signal (G23) having a gradually decreasing fluctuation.

Such shaping signals based on damping may enhance a residual vibration reduction effect as compared to the case of undamped vibration. In addition, the type of shaping signals may be selectively applied based on the sensitivity levels thereof.

Referring to G23 in FIG. 9B, the convoluted shaping signal has a relatively low rate of errors occurring due to vibration even beyond a resonance period. Thus, a resonance may be offset while being most insensitive to an error.

Figure 10:
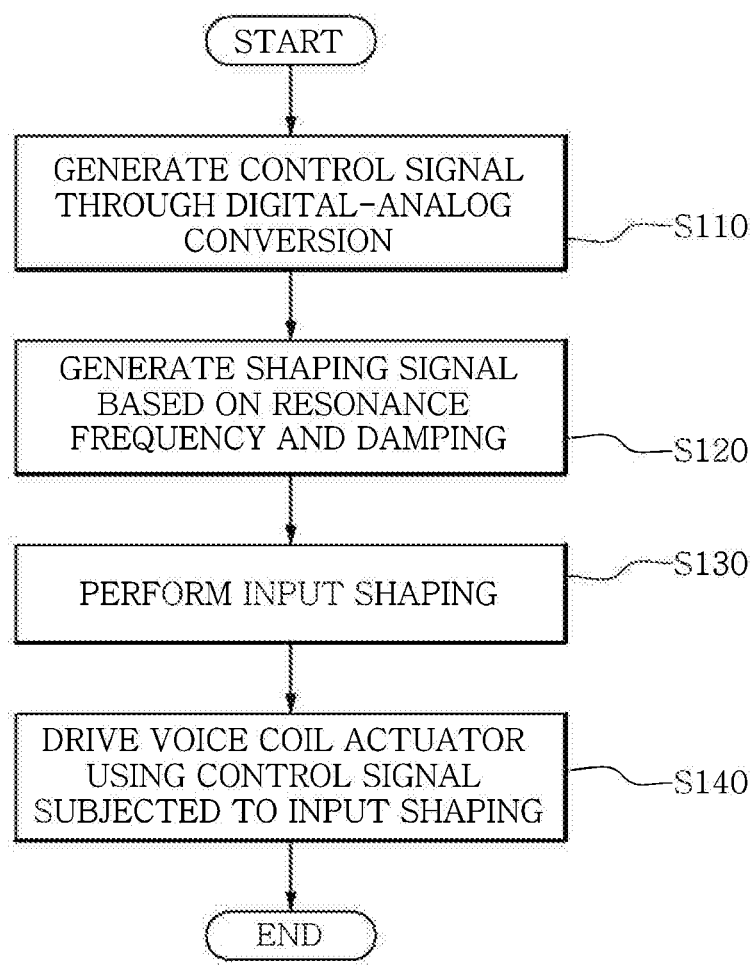
FIG. 10 is a flowchart illustrating a method of driving a voice coil actuator of a camera according to an embodiment.

FIG. 10 is a flowchart illustrating a method of driving a voice coil actuator of a camera according to an embodiment.

In operation S110, a voice coil actuator driving apparatus 100 generates a reference signal in response to a command of an arbitrary user through digital-analog conversion. In this instance, the reference signal is an unshaped control signal.

In operation S120, the voice coil actuator driving apparatus 100 generates a sequence impulses required for input shaping based on a resonance frequency of the voice coil actuator 200 and the damping of vibration in the voice coil actuator 200.

The sequence of impulses is composed of impulses having amplitude that is adjusted based on damping. The time location and the amplitude of the impulses constituting a sequence may be determined based on the resonance frequency of the voice coil actuator 200 and the vibration damping of the voice coil actuator 200.

In this instance, the resonance frequency and damping of the voice coil actuator 200 for input shaping may be preset, or may be detected during the driving of the voice coil actuator 200.

In operation S130, the voice coil actuator driving apparatus 100 performs input shaping that converts an initial input of a control signal using the sequence of impulses generated in operation S120.

The unshaped control signal generated in operation S110 may be convoluted with the sequence of impulses generated in operation S120 to thereby generate a control signal subjected to input shaping using a shaping signal as an initial input.

The shaping signal used as an initial input of the control signal is a signal having a fluctuation gradually decreasing due to damping. Examples of the shaping signal may include the aforesaid 2-step shaping signal, a multi-step shaping signal having multiple steps in a range of 4 to 16, a curved shaping signal having 16 or more steps, and a toggle shaping signal.

Alternatively, the shaping signal may be a convoluted shaping signal obtained by convoluting pure shaping signals. In this case, each of the convoluted shaping signals may have a gradually decreasing fluctuation corresponding to vibration damping of the voice coil actuator 200. Examples of the convoluted shaping signal may include a 2-step shaping signal, a multi-step shaping signal having multiple steps in a range of 4 to 16, a curved shaping signal, and a toggle shaping signal.

In the case where the shaping signal is a toggle shaping signal having a toggle period, the voice coil actuator driving apparatus 100 may gradually decrease a signal fluctuation of each toggle edge by applying damping for each edge to each toggle edge.

In the case where the shaping signal is a 2-step shaping signal, the voice coil actuator driving apparatus 100 may divide a target level into two steps to generate a 2-step shaping signal having a varying (e.g., increasing) level, and delays a phase for each step by "a total phase/2" to output the signal. The input shaping unit 110 applies a second step signal having a phase delayed by "a total phase/2" after applying a first step signal.

In the case where the shaping signal is an N-step shaping signal (N being a natural number in a range of 4 to 16), the voice coil actuator driving apparatus 100 may divide a target level into N number of steps, generates an N-step shaping signal having a gradually varying level, and delays a phase for each step by "a total phase/N" to output the signal. On the other hand, the input shaping unit 110 applies a damping value for each step to each step of the multi-step shaping signal based on damping to thereby gradually decrease the signal fluctuation of each step.

In addition, the voice coil actuator driving apparatus 100 may divide N number of steps into 16 or more, applies a damping value for each step to each step based on damping, gradually decreases a signal fluctuation of each step, and generates a curved shaping signal having a gradually varying level.

In the case where the shaping signal is an N-step shaping signal having the aforesaid N number of steps (N=2, in a range of 4 to 10, or 16 or more), when a resonance period of the voice coil actuator 200 is $T_{vib}$, a target level is A, and a coefficient for each step is $k_i$, the voice coil actuator driving apparatus 100 may enable the level of the multi-step shaping signal to reach the target level A within $T_{vib}$ by sequentially applying each step of the multi-step shaping signal so as to increase or decrease the level of each step by $k_i*(A/N)$ with respect to the N number of steps.

The voice coil actuator driving apparatus 100 may divide a shape of each step so that waveforms of signals having multiple steps have resonance frequencies that offset by one another.

As such, the voice coil actuator driving apparatus 100 generates a control signal using a shaping signal as an initial input from an unshaped control signal in response to a user command by performing input shaping based on the resonance frequency of the voice coil actuator 200 and the vibration damping in the voice coil actuator 200.

In operation S140, the voice coil actuator driving apparatus 100 drives the voice coil actuator 200 connected to a rear end of the driving unit 120 in response to the control signal subjected to input shaping by performing operations of level shift or current supply based on the control signal subjected to input shaping.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

INDUSTRIAL APPLICABILITY embodiments of the invention are directed to a voice coil actuator (VCA), and more particularly, to an apparatus for driving a voice coil actuator of a camera and a method thereof.

The invention claimed is:

1. An apparatus for driving a voice coil actuator of a camera, the apparatus comprising:
   an input shaping unit configured to perform input shaping of an unshaped control signal to generate a multi-step control signal, in which a target magnitude (A) from the unshaped control signal is divided into a plurality of N-numbered steps (N is an integer greater than 1) distributed over a resonance period ($T_{vib}$) of the voice coil actuator such that each step delays a phase of the multi-step control signal by $T_{vib}/N$ such that each step has a magnitude of $k_i*(A/N)$ that is gradually decreasing in sequence based on a damping ratio of the voice coil actuator over the plurality of N-numbered steps of the multi-step control signal and further such that the multi-step control signal reaches the target magnitude in the resonance period ($T_{vib}$), wherein $k_i$ is a coefficient for each step, wherein i is an integer of 1 through N and represents the step's order in the sequence; and
   a driving unit configured to drive the voice coil actuator using the multi-step control signal from the input shaping unit.

2. The apparatus of claim 1, wherein the input shaping unit is configured to distribute the phase of each step so as to allow signals constituting the plurality of N-numbered steps to have a resonance period in which waveforms of the signals are offset by one another.

3. The apparatus of claim 1, wherein the input shaping unit is configured to convolute a first shaping signal and a second shaping signal to generate the multi-step control signal, each of the first and second shaping signals being a multi-step shaping signal and having a signal fluctuation gradually decreasing based on the damping ratio.

4. A method of driving a voice coil actuator of a camera, the method comprising:
   receiving, by an input shaping unit, an unshaped control signal;
   performing, by the input shaping unit, input shaping of the unshaped control signal to generate a multi-step control signal, in which a target magnitude (A) from the unshaped control signal is divided into a plurality of N-numbered steps (N is an integer greater than 1) distributed over a resonance period ($T_{vib}$) of the voice coil actuator such that each step delays a phase of the multi-step control signal by $T_{vib}/N$ such that each step has a magnitude of $k_i*(A/N)$ that is gradually decreasing in sequence based on a damping ratio of the voice coil actuator over the plurality of N-numbered steps of the multi-step control signal and further such that the multi-step control signal reaches the target magnitude in the resonance period ($T_{vib}$), wherein $k_i$ is a coefficient for each step, wherein i is an integer of 1 through N and represents the step's order in the sequence;
   driving the voice coil actuator using the multi-step control signal from the input shaping unit.

5. The method of claim 4, wherein performing comprises distributing the phase of each step so as to allow signals constituting the plurality of N-numbered steps to have a resonance period in which waveforms of the signals are offset by one another.

6. The method of claim 4, wherein performing comprises convoluting a first shaping signal and a second shaping signal to generate the multi-step control signal, each of the first and second shaping signals being a multi-step shaping signal and having a signal fluctuation gradually decreasing based on the damping ratio.

* * * * *